(12) United States Patent
Shirane et al.

(10) Patent No.: US 11,056,723 B2
(45) Date of Patent: Jul. 6, 2021

(54) NONAQUEOUS ELECTROLYTE SECONDARY BATTERY

(71) Applicant: Panasonic Intellectual Property Management Co., Ltd., Osaka (JP)

(72) Inventors: Takayuki Shirane, Osaka (JP); Takanobu Chiga, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 157 days.

(21) Appl. No.: 15/859,856

(22) Filed: Jan. 2, 2018

(65) Prior Publication Data

US 2018/0123173 A1 May 3, 2018

Related U.S. Application Data

(63) Continuation of application No. PCT/JP2016/003660, filed on Aug. 9, 2016.

(30) Foreign Application Priority Data

Sep. 7, 2015 (JP) .............................. JP2015-175925

(51) Int. Cl.
*H01M 10/0587* (2010.01)
*H01M 10/0525* (2010.01)
(Continued)

(52) U.S. Cl.
CPC ....... *H01M 10/0587* (2013.01); *H01M 4/525* (2013.01); *H01M 4/587* (2013.01);
(Continued)

(58) Field of Classification Search
CPC ........... H01M 10/052; H01M 10/0525; H01M 10/0569; H01M 10/0585; H01M 10/0587;
(Continued)

(56) References Cited

U.S. PATENT DOCUMENTS

| 2009/0181308 A1 | 7/2009 | Chiga et al. |
| 2010/0104945 A1 | 4/2010 | Kozuki et al. |

(Continued)

FOREIGN PATENT DOCUMENTS

| JP | 8-055636 A | 2/1996 |
| JP | 2949705 B2 | 9/1999 |

(Continued)

OTHER PUBLICATIONS

International Search Report dated Nov. 1, 2016, issued in counterpart International Application No. PCT/JP2016/003660 (2 pages).

(Continued)

*Primary Examiner* — Mayla Gonzalez Ramos
(74) *Attorney, Agent, or Firm* — Westerman, Hattori, Daniels & Adrian, LLP

(57) ABSTRACT

A nonaqueous electrolyte secondary battery includes a positive electrode, a negative electrode, a separator disposed between the positive electrode and the negative electrode, and a nonaqueous electrolyte. The negative electrode includes an opposing region that opposes the positive electrode with the separator disposed therebetween and a non-opposing region that does not oppose the positive electrode but opposes the separator. In the case that the discharge cut-off voltage of the nonaqueous electrolyte secondary battery is in the range of 2.5 V to 3.0 V, a part of the non-opposing region adjacent to a boundary between the opposing region and the non-opposing region has an electric potential plateau in the range of −0.02 V to +0.02 V relative to a negative electrode potential in the opposing region.

4 Claims, 5 Drawing Sheets

(51) Int. Cl.
*H01M 4/587* (2010.01)
*H01M 10/44* (2006.01)
*H01M 10/04* (2006.01)
*H01M 4/525* (2010.01)
*H01M 10/0569* (2010.01)
*H01M 4/131* (2010.01)
*H01M 4/133* (2010.01)

(52) U.S. Cl.
CPC ... *H01M 10/0431* (2013.01); *H01M 10/0525* (2013.01); *H01M 10/0569* (2013.01); *H01M 10/446* (2013.01); *H01M 4/131* (2013.01); *H01M 4/133* (2013.01); *H01M 2220/20* (2013.01); *H01M 2300/004* (2013.01); *Y02E 60/10* (2013.01); *Y02T 10/70* (2013.01)

(58) Field of Classification Search
CPC .... H01M 10/446; H01M 4/131; H01M 4/133; H01M 4/505; H01M 4/525; H01M 4/587; H01M 2004/027; H01M 2004/028; H01M 2220/20; H01M 2300/004; H01M 10/0431; Y02E 60/10; Y02T 10/70
See application file for complete search history.

(56) References Cited

U.S. PATENT DOCUMENTS

| | | |
|---|---|---|
| 2011/0008661 A1 | 1/2011 | Kozuki et al. |
| 2014/0210480 A1 | 7/2014 | Hamaguchi |
| 2015/0030931 A1* | 1/2015 | Takahata ............... H01M 4/133 |
| | | 429/231.8 |
| 2017/0256822 A1* | 9/2017 | Onoda ................. H01M 4/133 |

FOREIGN PATENT DOCUMENTS

| | | |
|---|---|---|
| JP | 2008-10157 A | 1/2008 |
| JP | 2009-164082 A | 7/2009 |
| JP | 2013-197051 A | 9/2013 |
| JP | 2013-197052 A | 9/2013 |
| WO | 2008/111284 A1 | 9/2008 |
| WO | 2009/110250 A1 | 9/2009 |
| WO | 2013/035202 A1 | 3/2013 |
| WO | WO-2013088540 A1 * | 6/2013 |

OTHER PUBLICATIONS

Office Action dated Sep. 8, 2020, issued in counterpart JP Application No. 2017-538849, with English translation (8 pages).

* cited by examiner

NONAQUEOUS ELECTROLYTE SECONDARY BATTERY

TECHNICAL FIELD

The present disclosure relates to a nonaqueous electrolyte secondary battery.

BACKGROUND ART

In recent years, nonaqueous electrolyte secondary batteries have been used as power sources of electrical devices, and furthermore, increasingly as power sources of electric cars. Further improvement in the battery characteristics, such as energy density, power density, and charge-discharge cycle characteristics, of nonaqueous electrolyte secondary batteries is desired.

PTL 1 to PTL 3 disclose a technique of improving battery characteristics by over-discharging a nonaqueous electrolyte secondary battery during discharging after charging the nonaqueous electrolyte secondary battery.

CITATION LIST

Patent Literature

PTL 1: Japanese Patent No. 2949705
PTL 2: Japanese Published Unexamined Patent Application No. 2009-164082
PTL 3: Japanese Published Unexamined Patent Application No. 2013-197051

SUMMARY OF INVENTION

The technique disclosed in PTL 1 to PTL 3, however, cannot sufficiently suppress a decrease in the capacity during initial charge-discharge cycles (e.g., 1 cycle to about 200 cycles).

An object of the present disclosure is to provide a nonaqueous electrolyte secondary battery in which a decrease in the capacity during initial charge-discharge cycles can be suppressed.

For example, a nonaqueous electrolyte secondary battery according to the present disclosure includes a positive electrode, a negative electrode, a separator disposed between the positive electrode and the negative electrode, and a nonaqueous electrolyte. The negative electrode includes an opposing region that opposes the positive electrode with the separator disposed therebetween and a non-opposing region that does not oppose the positive electrode but opposes the separator. In the case that the discharge cut-off voltage of the nonaqueous electrolyte secondary battery is in the range of 2.5 V to 3.0 V, a part of the non-opposing region adjacent to a boundary between the opposing region and the non-opposing region has an electric potential plateau in the range of −0.02 V to +0.02 V relative to a negative electrode potential in the opposing region.

In the nonaqueous electrolyte secondary battery according to the present disclosure, a decrease in the capacity during initial charge-discharge cycles can be suppressed.

DESCRIPTION OF EMBODIMENTS

Fundamental Knowledge of Present Disclosure

Figure 1:
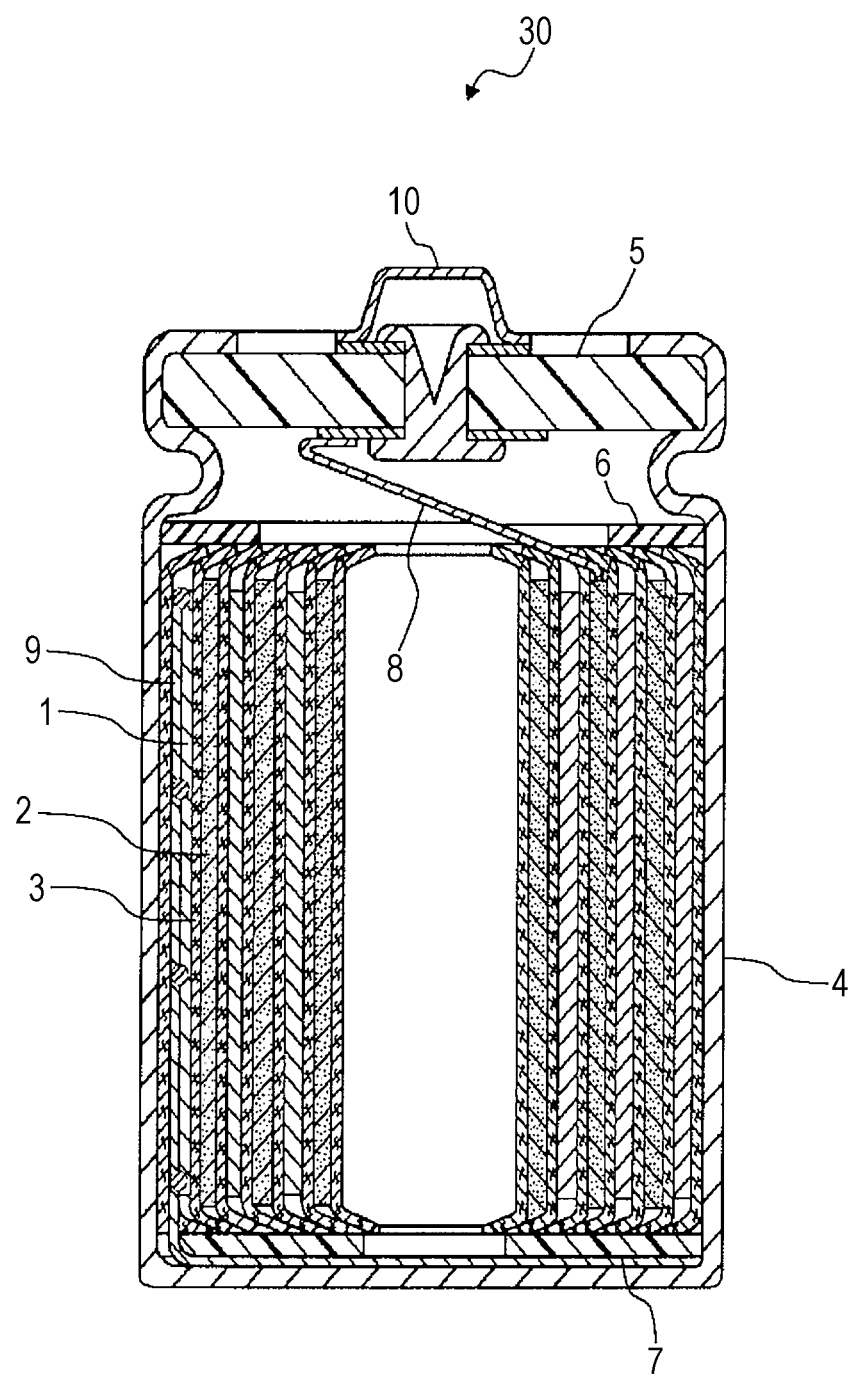
FIG. 1 is a schematic sectional view of a nonaqueous electrolyte secondary battery according to an embodiment.

In a nonaqueous electrolyte secondary battery, a positive electrode and a negative electrode are disposed so as to oppose each other with a separator disposed therebetween. From the viewpoint of, for example, battery characteristics, the negative electrode is typically produced so as to be larger than the positive electrode. In the negative electrode, an opposing region that opposes the positive electrode with the separator disposed therebetween and a non-opposing region that does not oppose the positive electrode but opposes the separator are formed. When the nonaqueous electrolyte secondary battery starts to be charged, lithium is intercalated into the opposing region of the negative electrode, while lithium is not intercalated into the non-opposing region. Thus, the negative electrode potential in the non-opposing region is typically higher than that of the opposing region. Therefore, in a part of the non-opposing region adjacent to a boundary between the opposing region and the non-opposing region, a large difference in the negative electrode potential is generated. To eliminate the large difference in the negative electrode potential in the part of the non-opposing region adjacent to the boundary, some of the lithium diffuses from the opposing region into the non-opposing region. Lithium in the opposing region also diffuses gradually into the non-opposing region as the charging progresses. However, the large difference in the negative electrode potential in the region adjacent to the boundary between the opposing region and the non-opposing region is retained even after discharging and charging are performed. Accordingly, during typical discharging, lithium that has diffused into the non-opposing region cannot be returned to the positive electrode, and during charging, lithium in the opposing region diffuses into the non-opposing region. The diffusion velocity of the lithium into the non-opposing region decreases with increasing the diffusion distance, that is, a distance from the boundary, and finally, the diffusion reaction appears to be completed. In other words, while charging and discharging are repeatedly performed, lithium that cannot be returned to the positive electrode accumulates in the non-opposing region, thereby decreasing the capacity of the battery. Such a decrease in the capacity due to the accumulation of lithium in the non-opposing region is considerable during initial charge-discharge cycles (e.g., 1 cycle to 200 cycles). In other words, a decrease in the capacity during the initial charge-discharge cycles is considerable.

According to one aspect of the present disclosure, in the nonaqueous electrolyte secondary battery that has been discharged to a discharge cut-off voltage of 2.5 V to 3.0 V, a part of the non-opposing region adjacent to the boundary between the opposing region and non-opposing region has an electric potential plateau in the range of −0.02 V to +0.02 V relative to the negative electrode potential in the opposing region. Thus, the lithium diffusion from the opposing region into the non-opposing region is suppressed, and the accumulation of the lithium, in the non-opposing region, that cannot be returned to the positive electrode is reduced, thereby suppressing a decrease in the capacity during the initial charge-discharge cycles.

According to another aspect of the present disclosure, in the nonaqueous electrolyte secondary battery that has been discharged to a discharge cut-off voltage of 2.5 V to 3.0 V, a part of the non-opposing region adjacent to the boundary between the opposing region and non-opposing region has an electric potential plateau at 0.37 V (vs. Li/Li$^+$) or lower. Thus, the lithium diffusion from the opposing region into the non-opposing region is suppressed, and the accumulation of the lithium, in the non-opposing region, that cannot be returned to the positive electrode is reduced, thereby suppressing a decrease in the capacity during the initial charge-discharge cycles.

Hereinafter, with reference to the drawings, embodiments of the present disclosure will be fully described. The embodiments described below are examples, and the present disclosure is not limited thereto. The drawings referred to in the embodiments are schematic illustrations.

FIG. 1 is a schematic sectional view of a nonaqueous electrolyte secondary battery according to an embodiment. Although a nonaqueous electrolyte secondary battery 30 illustrated in FIG. 1 is a cylindrical battery, the structure of the nonaqueous electrolyte secondary batteries of the embodiment is not limited thereto, and prismatic batteries and laminate-type batteries are exemplified.

The nonaqueous electrolyte secondary battery 30 illustrated in FIG. 1 includes a negative electrode 1, a positive electrode 2, a separator 3 disposed between the negative electrode 1 and the positive electrode 2, a nonaqueous electrolyte (an electrolyte solution), a cylindrical battery housing 4, and a sealing plate 5. The nonaqueous electrolyte is injected into the battery housing 4. The negative electrode 1 and the positive electrode 2 are wound with the separator 3 disposed therebetween and, with the separator 3, form a wound electrode group. On each end in a longitudinal direction of the wound electrode group, an upper insulating plate 6 or a lower insulating plate 7 is disposed, and they are disposed in the battery housing 4. One end of a positive electrode lead 8 is connected to the positive electrode 2, and the other end of the positive electrode lead 8 is connected to a positive electrode terminal 10 disposed in the sealing plate 5. One end of a negative electrode lead 9 is connected to the negative electrode 1, and the other end of the negative electrode lead 9 is connected to the inner bottom of the battery housing 4. The lead and the member are connected to each other by, for example, welding. An opening end of the battery housing 4 is caulked with the sealing plate 5 to seal the battery housing 4.

The negative electrode 1 includes a negative electrode active material layer containing a negative electrode active material. From the viewpoint of current collecting properties or the like, it is preferable that the negative electrode 1 include a negative electrode current collector, and a negative electrode active material layer be formed on the negative electrode current collector. The negative electrode active material layer is preferably disposed on both surfaces of the negative electrode current collector but may be disposed on a single surface of the negative electrode current collector.

The positive electrode 2 includes a positive electrode active material layer containing a positive electrode active material. From the viewpoint of current collecting properties or the like, it is preferable that the positive electrode 2 include a positive electrode current collector, and a positive electrode active material layer be formed on the positive electrode current collector. The positive electrode active material layer is preferably disposed on both surfaces of the positive electrode current collector but may be disposed on only a single surface of the positive electrode current collector. The positive electrode active material layer may contain a positive electrode additive in addition to the positive electrode active material.

Figure 2:
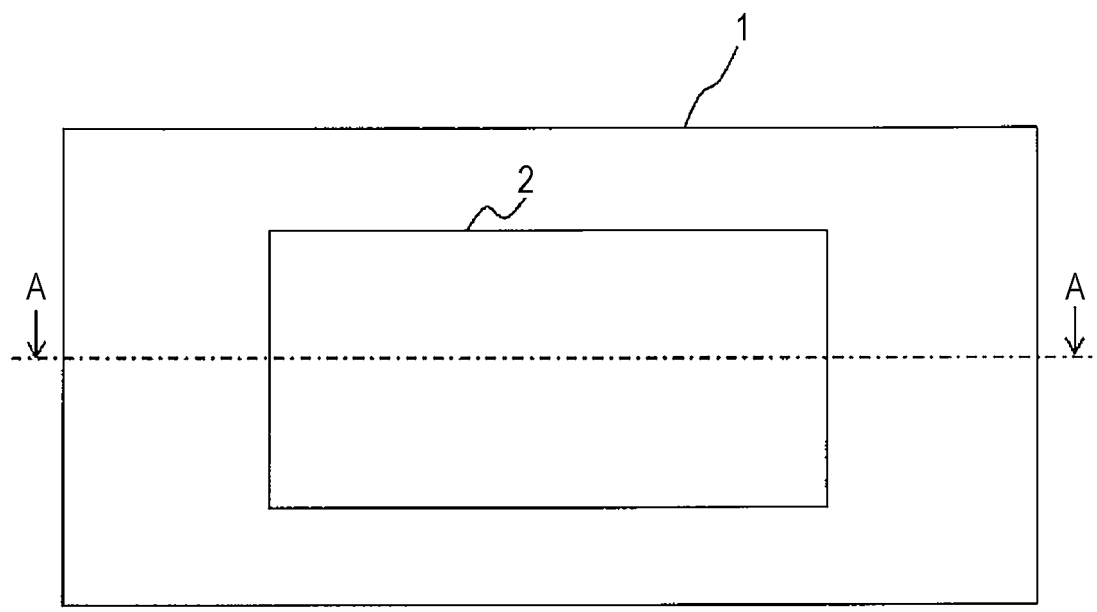
FIG. 2 is a schematic plan view showing a state of a negative electrode and a positive electrode opposing each other.
Figure 3:
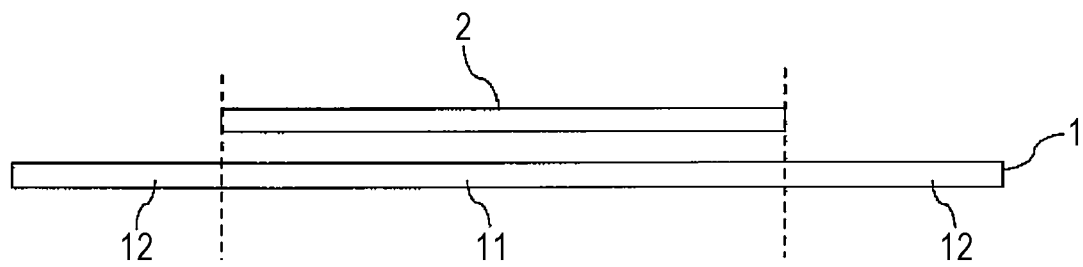
FIG. 3 is a sectional view taken along line A-A of FIG. 2.

FIG. 2 is a schematic plan view showing a state of the negative electrode and the positive electrode opposing each other. FIG. 2 is an illustration before the wound electrode group is produced and is a view of a state of the negative electrode 1 and the positive electrode 2 opposing each other, when viewed from the positive electrode side. The separator 3 is actually disposed between the negative electrode 1 and the positive electrode 2, but is omitted as a matter of convenience in describing the state of the negative electrode 1 and the positive electrode 2 opposing each other. The wound electrode group can be obtained by winding the negative electrode 1 and the positive electrode 2 in the longitudinal direction. FIG. 3 is a sectional view taken along line A-A of FIG. 2.

The size of the negative electrode 1 is designed to be larger than that of the positive electrode 2, and thus, the peripheral portion of the negative electrode 1 extends beyond the peripheral portion of the positive electrode 2. Therefore, the negative electrode 1 includes an opposing region 11 that opposes the positive electrode 2 with the separator (not shown) disposed therebetween and a non-opposing region 12 that does not oppose the positive electrode 2 but opposes the separator (not shown). The positive electrode 2 includes at least the positive electrode active material layer, and the negative electrode 1 includes at least the negative electrode active material layer. Thus, in other words, the negative electrode active material layer includes an opposing region that opposes a positive electrode active material layer with the separator disposed therebetween and the non-opposing region that does not oppose the positive electrode active material layer but opposes the separator. A region of the negative electrode (a negative electrode active material layer or a negative electrode current collector) that opposes only the positive electrode current collector with the separator therebetween is a non-opposing region. The difference in size between the negative electrode 1 and the positive electrode 2 may be set appropriately by a person of ordinary skill in the art.

Figure 4:
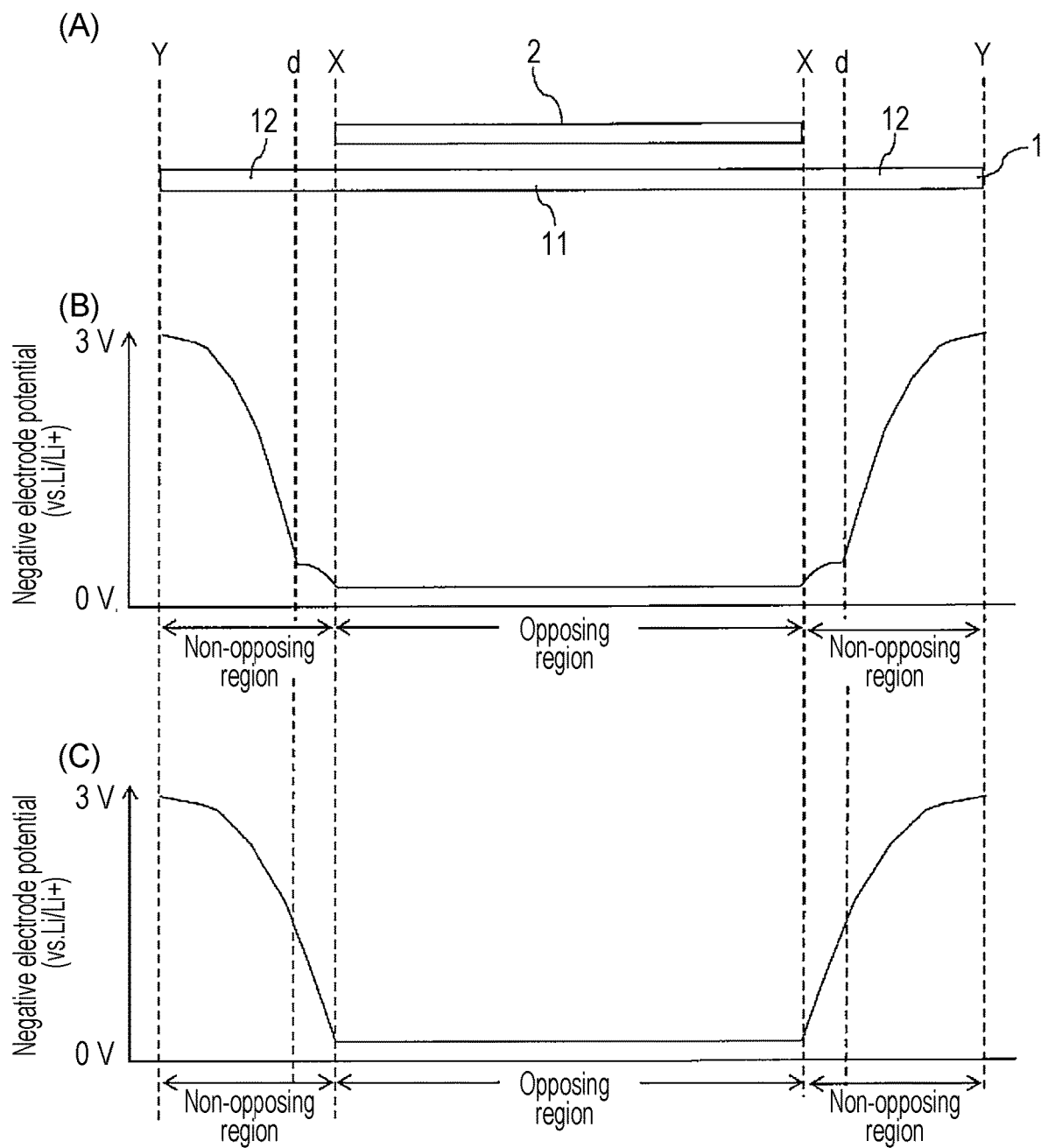
FIG. 4 is an illustration for describing negative electrode potentials in an opposing region and a non-opposing region of the negative electrode according to the present disclosure.

FIG. 4 is an illustration for describing negative electrode potentials in the opposing region and the non-opposing region of the negative electrode according to the present disclosure. FIG. 4(A) is a sectional view taken along line A-A of FIG. 2. FIG. 4(B) illustrates an example of the negative electrode potentials in the opposing region and the non-opposing region in a longitudinal direction of the negative electrode according to the present disclosure. FIG. 4(C) illustrates the negative electrode potentials in the opposing region and the non-opposing region in a longitudinal direction of an existing negative electrode. Here, FIG. 4(B) illustrates an example of the negative electrode potential in a battery in which a second step that will be described later has been performed, and the negative electrode potential is a negative electrode potential in the nonaqueous electrolyte secondary battery in which discharging has been stopped in the range of 2.5 V to 3.0 V. FIG. 4(C) illustrates an example of the negative electrode potential in a battery in which a typical charging and discharging have been performed once or more, and the negative electrode potential is a negative electrode potential in the nonaqueous electrolyte secondary battery in which discharging has been stopped in the range of 2.5 V to 3.0 V. The horizontal axes of FIG. 4(B) and FIG. 4(C) correspond to the negative electrode 1 in FIG. 4(A). In other words, in FIGS. 4(B) and 4(C), the negative electrode potential at the broken line X is a negative electrode potential at the boundary between the opposing region and the non-opposing region, and the negative electrode potential at the broken line Y is a negative electrode potential at a position farthest from the boundary in the non-opposing region. In FIGS. 4(B) and 4(C), the negative electrode potential from the broken line X to the broken line d is a negative electrode potential in the part of the non-opposing region adjacent to the boundary. The term "part of the non-opposing region adjacent to the boundary" refers to a region that extends toward the non-opposing region from the boundary (broken line X) by a predetermined distance. The predetermined distance is, for example, in the range of 1 mm to 4 mm, preferably, 1 mm to 2 mm.

In an existing negative electrode, as shown in FIG. 4(C), the negative electrode potential in the opposing region is about 0.1 to 0.3 V vs. Li/Li$^+$, at which lithium is intercalated or deintercalated. In the non-opposing region, the negative electrode potential increases rapidly in the part of the non-opposing region adjacent to the boundary and increases slowly in a direction away from the boundary beyond the part of the non-opposing region adjacent to the boundary.

As illustrated in FIG. 4(C), in an existing negative electrode, the negative electrode potential in the part of the non-opposing region adjacent to the boundary increases considerably relative to the negative electrode potential in the opposing region, and to eliminate this, lithium diffuses from the opposing region into the non-opposing region. Therefore, as described above, lithium diffuses from the opposing region into the non-opposing region during charging, and during discharging, lithium that has diffused into the non-opposing region cannot be returned to the positive electrode via the opposing region. In other words, due to repeatedly performing charging and discharging, lithium that cannot be returned to the positive electrode accumulates in the non-opposing region, and the capacity of the battery thereby decreases.

In the negative electrode 1 according to the present disclosure, as shown in FIG. 4(B), while the negative electrode potential in the opposing region is about 0.1 to 0.3 V vs. Li/Li$^+$, at which lithium is intercalated or deintercalated, the negative electrode potential hardly changes in the part of the non-opposing region adjacent to the boundary, compared with that in an existing negative electrode. In other words, in the negative electrode 1 according to the present disclosure, the part of the non-opposing region adjacent to the boundary has an electric potential plateau where the negative electrode potential hardly changes. In the negative electrode 1 according to the present disclosure, the part of the non-opposing region adjacent to the boundary between the opposing region and the non-opposing region has an electric potential plateau in the range of −0.02 V to +0.02 V relative to the electric potential in the opposing region. The potential plateau is preferably at 0.37 V (vs. Li/Li$^+$) or lower. In the negative electrode 1 according to the present disclosure, beyond the part of the non-opposing region adjacent to the boundary, the negative electrode increases (e.g., to 3 V (vs. Li/Li$^+$)) in a direction away from the boundary. In the electric potential plateau in the part of the non-opposing region adjacent to the boundary, the change in the electric potential is 0.02 V or lower. The change in the electric potential is expressed by the absolute value of the difference between the negative electrode potential at the boundary and the negative electrode potential at a position away from the boundary by the predetermined distance (e.g., 1 mm to 4 am, preferably 1 mm to 2 mm). The negative electrode potential at the boundary can be replaced with the negative electrode potential in the part of the opposing region adjacent to the boundary because the electric potential in the opposing region is flat.

In the negative electrode 1 according to the present disclosure, the negative electrode potential in the part of the non-opposing region adjacent to the boundary does not increase considerably relative to the negative electrode potential in the opposing region, compared with that in an existing negative electrode, and lithium diffusion from the opposing region into the non-opposing region can thereby be suppressed. Therefore, in the negative electrode 1 according to the present disclosure, compared with the existing negative electrode, lithium diffusion from the opposing region into the non-opposing region can be suppressed during charging, and even if charging and discharging are repeatedly performed, accumulation of lithium, in the non-opposing region, that cannot be returned to the positive electrode can be suppressed. As a result, compared with the existing negative electrode, a decrease in the capacity during the initial charge-discharge cycles can be suppressed.

The negative electrode 1 according to the present disclosure is a negative electrode of a nonaqueous electrolyte secondary battery in which discharging has been stopped in the range of 2.5 V to 3.0 V, and the negative electrode potential in the part of the non-opposing region adjacent to the boundary is preferably 0.37 V (vs. Li/Li$^+$) or lower. Due to satisfying the above conditions, the difference in the electric potential between the opposing region and the non-opposing region decreases, and a decrease in the capacity during the initial charge-discharge cycles can thereby be better suppressed than that in an existing negative electrode.

The negative electrode 1 according to the present disclosure is a negative electrode of a nonaqueous electrolyte secondary battery in which discharging has been stopped in the range of 2.5 V to 3.0 V, and the negative electrode potential gradient in the part of the non-opposing region adjacent to the boundary is preferably 20 mV/mm or lower. Due to satisfying the above conditions, the electric potential difference between the opposing region and the non-opposing region decreases, and a decrease in the capacity during the initial charge-discharge cycles can thereby be better suppressed than that in an existing negative electrode.

The negative electrode 1 according to the present disclosure is a negative electrode of a nonaqueous electrolyte secondary battery in which discharging has been stopped in the range of 2.5 V to 3.0 V, and the negative electrode potential in the part of the non-opposing region adjacent to the boundary is preferably less than or equal to the negative electrode potential in the opposing region and preferably less than the negative electrode potential in the opposing region by 0.01 to 0.02 V.

Hereinafter, an example of a method for producing the negative electrode according to the present disclosure will be described.

After assembling the nonaqueous electrolyte secondary battery illustrated in FIG. 1, for example, (1) a first step of charging the nonaqueous electrolyte secondary battery to a predetermined voltage at a predetermined charging rate and then allowing the nonaqueous electrolyte secondary battery to stand for a predetermined time is performed and (2) a second step of discharging the nonaqueous electrolyte secondary battery to a battery voltage (e.g., a battery voltage of 1.5 V to 1.9 V) lower than a typical discharge cut-off voltage at a high discharging rate (e.g., 1 C to 2 C) and then allowing the nonaqueous electrolyte secondary battery to stand for a predetermined time is performed after the first step, thereby obtaining a nonaqueous electrolyte secondary battery including a negative electrode in which the negative electrode potential gradient in the part of the non-opposing region adjacent to the boundary is less than that in the part of the non-opposing region farthest from the boundary.

Figure 5:
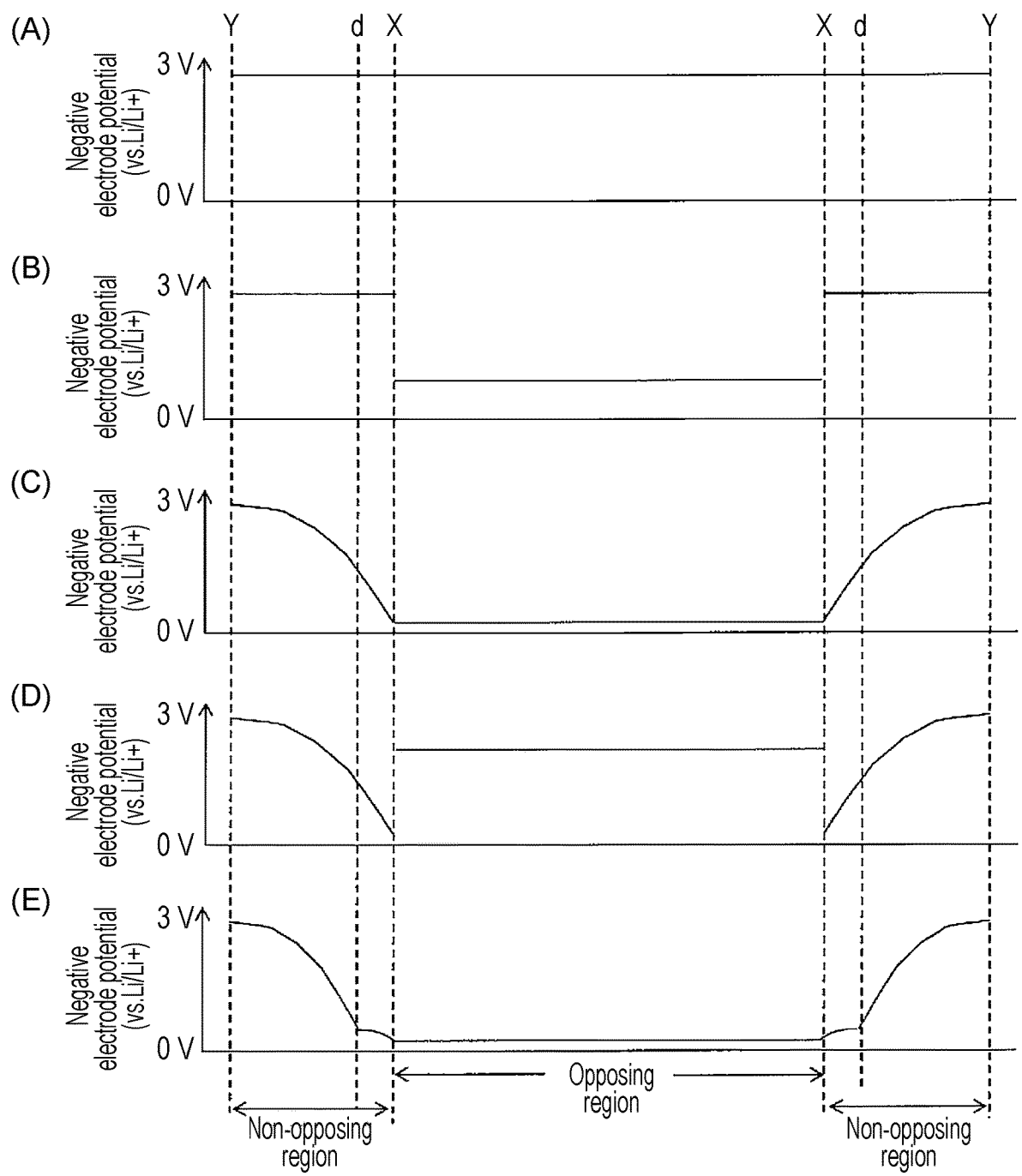
FIG. 5 is an illustration for describing negative electrode potentials in the opposing region and the non-opposing region of the negative electrode in a process of producing a nonaqueous electrolyte secondary battery according to the present disclosure.

FIG. 5 is an illustration for describing negative electrode potentials in the opposing region and the non-opposing region of the negative electrode in a process of producing the nonaqueous electrolyte secondary battery according to the present disclosure. FIG. 5(A) shows the negative electrode potential just after the nonaqueous electrolyte secondary battery is assembled. FIG. 5(B) shows the negative electrode potential when charging is started at a predetermined charging rate. FIG. 5(C) shows the negative electrode potential after charging. FIG. 5(D) shows the negative electrode potential when discharging is performed to a predetermined voltage at a predetermined discharging rate. FIG. 5(E) shows the negative electrode potential after charging. The broken lines X, Y, and d in FIG. 5 are the same as those in FIG. 4. In other words, in FIG. 5, the negative electrode potential at the broken line X is a negative electrode potential at the boundary between the opposing region and the non-opposing region, the negative electrode potential at the broken line Y is a negative electrode potential at a position farthest from the boundary in the non-opposing region, and the negative electrode potential from the broken line X to the broken line d is a negative electrode potential in the part of the non-opposing region adjacent to the boundary.

Just after assembling the nonaqueous electrolyte secondary battery, as shown in FIG. 5(A), since lithium is not intercalated into the negative electrode, the opposing region and the non-opposing region have a high constant negative electrode potential. For example, in the case that the negative electrode has a negative electrode current collector made of copper foil and a negative electrode active material made of graphite, the negative electrode potential is about 3 V (vs. Li/Li$^+$). When the charging in the first step is started after assembling the battery, lithium is intercalated into the opposing region, and, as shown in FIG. 5(B), the negative electrode potential in the opposing region is thereby rapidly decreased to an electric potential at which lithium is intercalated (e.g., 0.1 to 0.3 V (vs. Li/Li$^+$)). On the other hand, since lithium is not intercalated into the non-opposing region, the non-opposing region has a high negative electrode potential. As charging progresses, since the non-opposing region having a high negative electrode potential is in contact with the opposing region having a low negative electrode potential, the electric potential difference between the two regions causes lithium diffusion from the opposing region into the non-opposing region. After the first step is completed, for example, as shown in FIG. 5(C), the negative electrode potential changes such that the negative electrode potential increases rapidly in the part of the non-opposing region adjacent to the boundary and increases slowly beyond the part of the non-opposing region adjacent to the boundary.

If typical charging and discharging are performed, the negative electrode potential in the opposing region changes in a relatively small range (e.g., 0.1 to 0.3 V (vs. Li/Li$^+$)), which is not sufficient for transferring lithium from the non-opposing region to the opposing region. Thus, after the first step is completed, the discharging in the second step is performed. For example, in the case that the positive electrode active material is a lithium transition metal composite oxide and the negative electrode active material is graphite, the discharge cut-off voltage is typically set to about 2.5 V to 3.2 V. In the second step, the discharge cut-off voltage is set to 1.4 V to 1.9 V. As shown in FIG. 5(D), such discharging generates a large electric potential difference between the opposing region and the part of the non-opposing region adjacent to the boundary, and lithium in the non-opposing region is thereby forcibly returned to the opposing region. In this case, lithium is returned to the positive electrode via the opposing region sequentially from the part of the non-opposing region adjacent to the boundary, and therefore, the negative electrode potential decreases sequentially from the part of the non-opposing region adjacent to the boundary. Only a small amount of lithium contained in a carbon material such as graphite retains a low electric potential. The completion of the second step, as shown FIG. 5(E), provides a nonaqueous electrolyte secondary battery that includes a negative electrode that has an electric potential plateau at 0.37 V (vs. Li/Li$^+$) or lower in the part of the non-opposing region adjacent to the boundary.

(First Step)

The charging conditions in the first step are desirably set to conditions in which lithium transfer is facilitated from the opposing region to the non-opposing region. Thus, in the second step that follows, the negative electrode potential in the part of the non-opposing region adjacent to the boundary can be decreased more effectively. From the viewpoint of facilitating the lithium transfer from the opposing region to the non-opposing region, charging in the first step is preferably performed at a designed voltage or at a voltage slightly higher than the designed voltage, for example, in the range of 4.2 V to 4.25 V, and the time to allow the battery to stand after charging is preferably 3 hours or longer. The first step may be performed a plurality of times. For example, after charging a battery to a predetermined battery capacity (e.g., 50% SOC) and then allowing the battery to stand for a predetermined time are performed, charging the battery to a predetermined voltage and then allowing the battery to stand for a predetermined time may be performed. The first step may be performed after the nonaqueous electrolyte secondary battery is assembled, however, the first step may be started after 1 to 3 cycles of charging and discharging are performed after the nonaqueous electrolyte secondary battery is assembled.

(Second Step)

The discharging conditions in the second step are desirably set to conditions in which lithium at least in the part of the non-opposing region adjacent to the boundary is returned to the positive electrode via the opposing region. The discharging rate in the second step depends on the battery design, but is preferably in the range of 0.5 C to 1 C, and the time to allow the battery to stand is preferably, for example, 24 hours or longer. While allowing the battery to stand, performing heating is effective. If the discharge rate and the time to allow the battery to stand are out of the above ranges, the efficiency of the lithium transfer at least from the part of the non-opposing region adjacent to the boundary to the positive electrode via the opposing region may be degraded. The discharge cut-off voltage in the second step is preferably, for example, 1.4 V to 1.9 V. In the case that the discharge cut-off voltage in the second step is higher than 1.9 V, lithium at least in the part of the non-opposing region adjacent to the boundary may be unlikely to be returned to the positive electrode via the opposing region. In the case that the discharge cut-off voltage in the second step is lower than 1.4 V, the negative electrode current collector may melt, for example.

The negative electrode according to the present disclosure is not limited to a negative electrode produced in the first step and the second step, provided that in the case that the discharge cut-off voltage of the nonaqueous electrolyte secondary battery is 2.5 V to 3.0 V, the part of the non-opposing region adjacent to the boundary has an electric potential plateau where the negative electrode potential hardly changes from the negative electrode potential in the opposing region.

Hereinafter, materials used for the nonaqueous electrolyte secondary battery according to the present disclosure will be described.

Examples of the positive electrode active material constituting the positive electrode 2 include lithium transition metal oxides containing a transition metal element, such as Co, Mn, or Ni. Examples of the lithium transition metal oxide include lithium transition metal oxides having a layered crystalline structure, such as $Li_xCoO_2$, $Li_xNiO_2$, $Li_xMnO_2$, $Li_xCo_yNi_{1-y}O_2$, $Li_xCo_yM_{1-y}O_z$, and $Li_xNi_{1-y}M_yO_z$; and $Li_xMn_2O_4$, $Li_xMn_{2-y}M_yO_4$, $LiMPO_4$, and $Li_2MPO_4F$ (M; at least one of Na, Mg, Sc, Y, Mn, Fe, Co, Ni, Cu, Zn, Al, Cr, Pb, Sb, and B). Here, $0<x\leq1.2$ (value just after production of the active material, increases or decreases due to charging and discharging), $0<y\leq0.9$, and $2.0\leq z\leq2.3$.

Examples of the negative electrode active material constituting the negative electrode 1 include natural graphite, synthetic graphite, carbon, and a mixture thereof.

Regarding a combination of the positive electrode active material and the negative electrode active material, the positive electrode active material is preferably a lithium transition metal oxide having a layered crystalline structure, such as $Li_xCoO_2$, $Li_xNiO_2$, $Li_xMnO_2$, or oxides obtained by substituting some transition metals of the foregoing lithium transition metal oxides with other elements, and the negative electrode active material is preferably a carbon material, such as natural graphite or synthetic graphite. Due to the combination of the positive electrode active material and the negative electrode active material, in a nonaqueous electrolyte secondary battery in which discharging has been stopped in the range of 2.5 V to 3.0 V, the negative electrode potential in the part of the non-opposing region adjacent to the boundary is likely to be 0.37 V (vs. Li/Li$^+$) or lower, and the initial deterioration of the cycle characteristics can thereby be further suppressed. The negative electrode potential in the part of the non-opposing region adjacent to the boundary is more preferably 0.35 V (vs. Li/Li$^+$) or lower. In the case that the negative electrode potential in the part of the non-opposing region adjacent to the boundary is 0.37 V (vs. Li/Li$^+$) or lower, the electric potential plateau in the part of the non-opposing region adjacent to the boundary, in which the negative electrode potential hardly changes from the negative electrode potential in the opposing region, is at 0.37 V (vs. Li/Li$^+$) or lower. In the case that the negative electrode potential in the part of the non-opposing region adjacent to the boundary is 0.35 V (vs. Li/Li$^+$) or lower, the electric potential plateau in the part of the non-opposing region adjacent to the boundary, in which the negative electrode potential hardly changes from the negative electrode potential in the opposing region, is at 0.35 V (vs. Li/Li$^+$) or lower.

The positive electrode active material layer preferably contains an electroconductive agent and a binder in addition to the positive electrode active material. The positive electrode active material layer can be obtained, for example, by mixing a positive electrode active material, an electroconductive agent, and a binder in an appropriate solvent, applying the resulting mixture to the positive electrode current collector, performing drying, and performing rolling. The thickness of the positive electrode active material layer formed on a single surface of the positive electrode current collector is preferably, for example, about 50 μm to 60 μm. The positive electrode current collector may be formed of an electroconductive thin sheet, such as a metal foil or alloy foil of aluminum or the like, which is stable in the electric potential range of the positive electrode, or a film having an outer layer made of a metal, such as aluminum. From the viewpoint of current collecting properties, mechanical strength, or the like, the positive electrode current collector preferably has a thickness of about 5 μm to 40 μm, more preferably about 10 μm to 20 μm.

The negative electrode active material layer may contain, for example, a binder in addition to the negative electrode active material. The negative electrode active material layer can be obtained, for example, by mixing a negative electrode active material and a binder in water or an appropriate solvent, applying the resulting mixture to the negative electrode current collector, performing drying, and performing rolling. The thickness of the negative electrode active material layer formed on a single surface of the negative electrode current collector is preferably, for example, about 50 μm to 60 μm. The negative electrode current collector may be formed of an electroconductive thin sheet, such as a metal foil or alloy foil of copper or the like, which is stable in the electric potential range of the negative electrode, or a film having an outer layer made of a metal, such as copper. Similarly to the positive electrode current collector, the negative electrode current collector preferably has a thickness of about 5 μm to 40 μm, more preferably about 7 μm to 15 μm.

The electroconductive agent is, for example, an electroconductive powder or electroconductive particles and is used, for example, to improve electron conductivity of the positive electrode active material layer. The electroconductive agent is, for example, an electroconductive carbon material, metal powder, organic material or the like. Specifically, examples of the carbon material include acetylene black, KETJENBLACK, and graphite; an example of the metal powder is aluminum; and examples of the organic material include phenylene derivatives.

The binder is, for example, a fluorine-based polymer or a rubber-based polymer. Specifically, examples of the fluorine-based polymer include polytetrafluoroethylene (PTFE), poly(vinylidene fluoride) (PVdF), and modified products thereof. Examples of the rubber-based polymer include ethylene-propylene-isoprene copolymers and ethylene-propylene-butadiene copolymers. The binder may be used in combination with a thickener, such as carboxymethylcellulose (CMC) or polyethylene oxide (PEO).

The separator 3 is a porous sheet having ion permeability and insulating properties. Examples of the porous sheet include microporous films, fabrics, and unwoven fabrics. The separator 3 is preferably made of cellulose or an olefin-based resin, such as polyethylene or polypropylene. The separator 3 preferably has a thickness of, for example, about 5 to 40 μm.

The nonaqueous electrolyte includes a nonaqueous solvent and an electrolyte salt that dissolves in the nonaqueous solvent. The nonaqueous electrolyte is not limited to a nonaqueous electrolyte solution, which is a liquid electrolyte, and may be a solid electrolyte. The electrolyte salt in the nonaqueous electrolyte secondary battery 30 may be a typically used supporting electrolyte, such as a lithium salt. Examples of the lithium salt include $LiPF_6$, $LiBF_4$, and $LiClO_4$.

EXAMPLES

Hereinafter, the present disclosure will be further described with reference to examples; however, the present disclosure is not limited to these examples.

<Production of Battery>

Powder mixing of 100 parts by weight of $LiNi_{0.80}Co_{0.17}Al_{0.03}O_2$ as the positive electrode active material, 1 part by weight of acetylene black as the electroconductive agent, and 1 part by weight of PVdF as the binder and then dispersing the resulting mixture in NMP such that the solid content was 70% were performed, and a positive electrode mixture paste was thereby obtained. Applying the obtained paste to both sides of an Al foil having a thickness of 15 μm such that the applied amount on a single surface was 24 mg/cm² was performed, followed by drying, and rolling was performed such that the thickness was 135 μm. Then, cutting to a width of 58 mm and a length of 660 mm and then welding to a lead made of Al were performed. A protection tape was pasted on the welded portion of the lead, thereby providing a positive electrode.

Powder mixing of 100 parts by weight of graphite as the negative electrode active material, 1 part by weight of CMC as the thickener, and 1 part by weight of SBR as the binder and then dispersing the resulting mixture in ion exchanged water such that the solid content was 50% were performed, and a negative electrode mixture paste was thereby obtained. Applying the obtained paste to both sides of a Cu foil having a thickness of 8 μm such that the applied amount on a single surface was 13 mg/cm² was performed, followed by drying, and rolling was performed such that the thickness was 161 μm. Then, cutting to a width of 61 mm and a length of 730 mm and then welding to a lead made of Ni was performed. A protection tape was pasted on the welded portion of the lead, thereby providing a negative electrode.

The positive electrode plate and the negative electrode plate were wound with a separator having a thickness of 16.5 μm therebetween and inserted into a cylindrical housing that had a bottom and a diameter of 18 mm. Then, the negative electrode lead was welded to the bottom, and the positive electrode lead was welded to a sealing plate. An electrolyte solution, which was 5.2 g of 1.4 M $LiPF_6$/EC:EMC:DMC=2:3:3, was injected, and caulking was performed with the sealing plate to produce a cylindrical battery.

After the produced battery was charged to 3.2 V at 1 A, the battery was allowed to stand (in a paused state) for three days at room temperature, charged to 3.6 V at 1 A and then allowed to stand (in a paused state) for three days at 45° C. Next, the battery was charged to 4.2 V at 1 A and discharged to 3 V at 1 A, and the capacity was then checked. The capacity was 3050 mA±50 mA. After checking the capacity, the battery was charged to an SOC of 50% and allowed to stand (in a paused state) for three days at room temperature. This battery is referred to as Battery A.

Battery in Example

Battery A, which had been allowed to stand for three days at room temperature, was charged at a constant voltage of 4.2 V at a current ranging from a minimum current of 150 mA to a maximum current of 750 mA (charging rate 0.25 C) and then allowed to stand (in a paused state) for three hours. Then Battery A was discharged to 1.6 V at 3 A (discharging rate 1 C). Next, the battery was allowed to stand (in a paused state) for two days in a thermostat in which the temperature is controlled at 45° C. Thereafter, the battery was left to cool to room temperature and served as a battery in Example.

Battery in Comparative Example

Battery A, which had been allowed to stand for three days at room temperature, was discharged to 3 V at 3 A. This battery served as a battery in Comparative Example.

<Charge-Discharge Cycle Characteristics>

The batteries in Example and Comparative Example were subjected to 100 cycles of a cycle test in which the batteries were charged at a constant voltage of 4.2 V at a current ranging from a minimum current of 150 mA to a maximum current of 750 mA and then discharged to 3 V at 750 mA.

Figure 6:
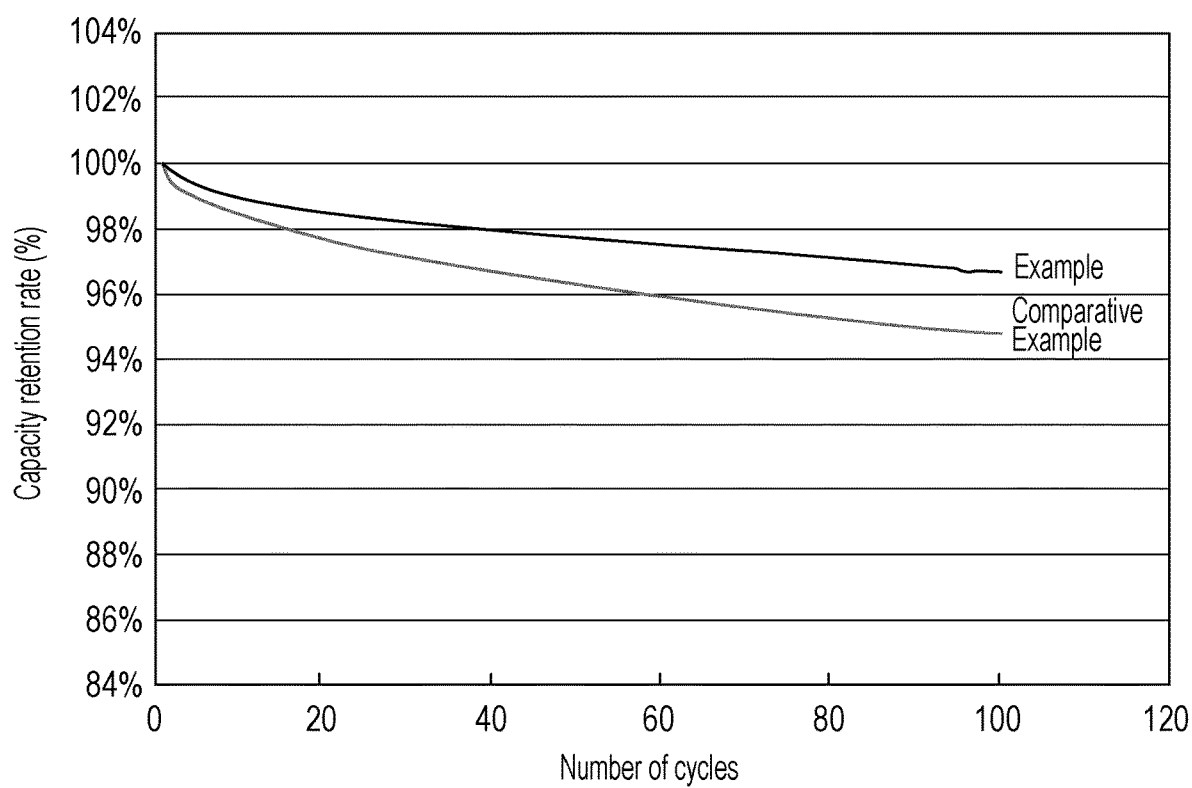
FIG. 6 is a graph of capacity retention rates of batteries in Example and Comparative Example in 1 to 100 cycles.

FIG. 6 is a graph of capacity retention rates of batteries in Example and Comparative Example in 1 to 100 cycles. As shown in FIG. 6, the capacity retention rate after 100 cycles was 96.7% in Example, and the capacity retention rate after 100 cycles was 94.9% in Comparative Example, which was lower than that in Example.

<Measurement of Negative Electrode Potential>

After the produced batteries in Example and Comparative Example were discharged to 3 V at 150 mA, each battery was disassembled, and the opposing positive electrode and negative electrode were collected. Predetermined regions in the opposing region and the non-opposing region of the negative electrode were cut into pieces of 1 mm×1 mm. Each piece was immersed in the electrolyte solution in a Petri dish, and the negative electrode potential, which is an electric potential relative to the potential of lithium metal, was measured. The results of the measured negative electrode potential are shown in Table 1.

TABLE 1

| | Negative electrode potential in part of opposing region adjacent to boundary (vs. Li/Li$^+$) | Negative electrode potential in part of non-opposing region adjacent to boundary (vs. Li/Li$^+$) | Negative electrode potential at a position in non-opposing region 2 mm away from boundary (vs. Li/Li$^+$) | Negative electrode potential at a position in non-opposing region 10 mm away from boundary (vs. Li/Li$^+$) |
|---|---|---|---|---|
| Example | 0.35 V | 0.34 V | 0.33 V | 0.37 V |
| Comparative Example | 0.34 V | 0.38 V | 0.37 V | 0.37 V |

In Example, the negative electrode potential in a region extending from the boundary toward the opposing region by 1 mm, that is, the negative electrode potential in the part of the opposing region adjacent to the boundary was 0.35 V (vs. Li/Li$^+$), and the negative electrode potential in a region extending from the boundary toward the non-opposing region by 1 mm, that is, the negative electrode potential in the part of the non-opposing region adjacent to the boundary was 0.34 V (vs. Li/Li$^+$). Since the negative electrode potential in the part of the opposing region adjacent to the boundary can be assumed to be equal to the negative electrode potential at the boundary, the amount of change in the electric potential in the part of the non-opposing region adjacent to the boundary was 0.01 V, thereby confirming that the electric potential plateau was formed in the part of the non-opposing region adjacent to the boundary. In contrast, in Comparative Example, the negative electrode potential in the part of the opposing region adjacent to the boundary was 0.34 V (vs. Li/Li$^+$), and the negative electrode potential in the part of the non-opposing region adjacent to the boundary was 0.38 V (vs. Li/Li$^+$). Therefore, the amount of change in the electric potential in the part of the non-opposing region adjacent to the boundary was 0.04 V, thereby confirming that the electric potential plateau was not formed in the part of the non-opposing region adjacent to the boundary. From the results of the test of cycle characteristics and the measurements of the negative electrode potential in Example and Comparative Example, it can be assumed that a decrease in the capacity of the nonaqueous electrolyte secondary battery during the initial charge-discharge cycles can be better suppressed in Example than in Comparative Example.

Experimental Example 1

After Battery A, which had been allowed to stand for three days at room temperature, was charged at a constant voltage of 4.2 V at a current ranging from a minimum current of 150 mA to a maximum current of 750 mA (charging rate 0.25 C) and then allowed to stand (in a paused state) for three hours, Battery A was discharged to 1.9 V at 3 A (discharging rate 1 C). Next, the battery was allowed to stand (in a paused state) for two days in a thermostat in which the temperature is controlled at 45° C. Thereafter, the battery was left to cool to room temperature and served as a battery in Experimental Example 1.

Experimental Example 2

After Battery A, which had been allowed to stand for three days at room temperature, was charged at a constant voltage of 4.2 V at a current ranging from a minimum current of 150 mA to a maximum current of 750 mA (charging rate 0.25 C) and then allowed to stand (in a paused state) for three hours, Battery A was discharged to 2.0 V at 3 A (discharging rate 1 C). Next, the battery was allowed to stand (in a paused state) for two days in a thermostat in which the temperature is controlled at 45° C. After that, the battery was left to cool to room temperature and served as a battery in Experimental Example 2.

In Experimental Example 1, the negative electrode potential in a region extending from the boundary toward the opposing region by 1 mm, that is, the negative electrode potential in the part of the opposing region adjacent to the boundary, was 0.34 V (vs. Li/Li$^+$), and the negative electrode potential in a region extending from the boundary toward the non-opposing region by 1 mm, that is, the negative electrode potential in the part of the non-opposing region adjacent to the boundary was 0.35 V (vs. Li/Li$^+$). Therefore, the amount of change in the electric potential in the part of the non-opposing region adjacent to the boundary was 0.01 V, thereby confirming that an electric potential plateau was formed in the part of the non-opposing region adjacent to the boundary. The capacity retention rate of the battery in Experimental Example 1 after 100 cycles was 96.8%, which was a better result than that in Comparative Example.

In Experimental Example 2, the negative electrode potential in the part of the opposing region adjacent to the boundary was 0.33 V (vs. Li/Li$^+$), the negative electrode potential in the part of the non-opposing region adjacent to the boundary was 0.37 V (vs. Li/Li$^+$), and the negative electrode potential at a position 10 mm away from the boundary in the non-opposing region (a position farthest from the boundary) was 0.38 V (vs. Li/Li$^+$). Therefore, the amount of change in the electric potential in the part of the non-opposing region adjacent to the boundary was 0.04 V, thereby confirming that an electric potential plateau was not formed in the part of the non-opposing region adjacent to the boundary. The capacity retention rate of the battery in Experimental Example 2 after 100 cycles was 95.1% and did not appear to be superior to that in Comparative Example. As shown in the results of Experimental Example 1 and Experimental Example 2, a decrease in the capacity during the initial charge-discharge cycles cannot be sufficiently suppressed sometimes under some conditions, such as the discharging conditions in the second step.

INDUSTRIAL APPLICABILITY

The present invention is applicable in secondary batteries in which a nonaqueous electrolyte is used.

REFERENCE SIGNS LIST 1 negative electrode
2 positive electrode
3 separator
4 battery housing
5 sealing plate
6 upper insulating plate
7 lower insulating plate
8 positive electrode lead
9 negative electrode lead
10 positive electrode terminal
11 opposing region
12 non-opposing region
30 nonaqueous electrolyte secondary battery

The invention claimed is:

1. A nonaqueous electrolyte secondary battery comprising a positive electrode, a negative electrode, a separator disposed between the positive electrode and the negative electrode, and a nonaqueous electrolyte, wherein
the negative electrode includes an opposing region that opposes the positive electrode with the separator disposed therebetween and a non-opposing region that does not oppose the positive electrode but opposes the separator, and
configured such that a discharge cut-off voltage of the nonaqueous electrolyte secondary battery is in a range of 2.5 V to 3.0 V, and a part of the non-opposing region adjacent to a boundary between the opposing region and the non-opposing region has an electric potential plateau in a range of −0.02 V to +0.02 V relative to a negative electrode potential in the opposing region,
wherein the part of the non-opposing region adjacent to the boundary is a region that extends toward the non-opposing region from the boundary by 1 mm to 2 mm, and
the non-opposed region comprises lithium.

2. The nonaqueous electrolyte secondary battery according to claim 1, configured such that a discharge cut-off voltage of the nonaqueous electrolyte secondary battery is in a range of 2.5 V to 3.0 V, and the part of the non-opposing region adjacent to the boundary between the opposing region and the non-opposing region has an electric potential plateau at 0.37 V (vs. Li/Li$^+$) or lower.

3. The nonaqueous electrolyte secondary battery according to claim 1, configured such that a discharge cut-off voltage of the nonaqueous electrolyte secondary battery is in a range of 2.5 V to 3.0 V, and a negative electrode potential in the part of the non-opposing region adjacent to the boundary is 0.37 V (vs. Li/Li$^+$) or lower.

4. The nonaqueous electrolyte secondary battery according to claim 2, configured such that a discharge cut-off voltage of the nonaqueous electrolyte secondary battery is in a range of 2.5 V to 3.0 V, and a negative electrode potential in the part of the non-opposing region adjacent to the boundary is 0.37 V (vs. Li/Li$^+$) or lower.

* * * * *